Sept. 29, 1959 J. N. SMITH ET AL 2,907,002

MESSAGE SPACING CONTROL SYSTEM

Filed March 29, 1954 3 Sheets-Sheet 1

INVENTORS
Joel N. Smith &
William R. Ayres
BY Morris [signature]
ATTORNEY

INVENTORS
Joel N. Smith &
William R. Ayres
BY Morris A. Rabkin
ATTORNEY

Sept. 29, 1959 J. N. SMITH ET AL 2,907,002

MESSAGE SPACING CONTROL SYSTEM

Filed March 29, 1954 3 Sheets-Sheet 3

INVENTORS

Joel N. Smith &

William R. Ayres

BY Morris A. Rabkin

ATTORNEY

United States Patent Office 2,907,002

Patented Sept. 29, 1959

2,907,002

MESSAGE SPACING CONTROL SYSTEM

Joel N. Smith, Westmont, and William R. Ayres, Oaklyn, N.J., assignors to Radio Corporation of America, a corporation of Delaware Application March 29, 1954, Serial No. 419,226

6 Claims. (Cl. 340—174)

This invention relates to control systems, and particularly to an arrangement for controlling the spacing of messages on a recording medium in an information handling system.

High-speed automatic data processing equipment is widely employed in modern industries. These systems sort, collate, and otherwise manipulate information stored on a recording medium. One widely used recording medium, suitable for storing messages in sequence, is magnetic tape.

An automatic data processing system which stores messages in sequence on magnetic tape or some other recording medium distinguishes between discrete blocks of information, usually messages. In doing so, the system may place variable length words and variable length messages closely together on the recording medium in what may be termed a variable word length system. This close "packing" of intelligence permits conservation of the recording medium, which is greatly to be desired when dealing with a voluminous amount of information. A variable word length system usually designates the commencement and termination of messages, and the termination of individual items, by individual and different character signals. Information may be recorded in the well-known binary system of notation, so that characters, including special signals, may be encoded on magnetic tape in combinations of individual binary digits. Any suitable code may be employed. One encoding scheme utilizes a seven digit binary combination for each character. For illustrative purposes, the use of this seven bit code in the present system is assumed. In this system of handling information, items, or words, form the unitary parts of messages, while characters are the unitary parts of words. The special signals employed may include start document SD, start message SM, and end message EM signals, each having a characteristic binary representation.

Since input information for a sorting system may be of an essentially random nature, it will be apparent that the recording systems may be required to run intermittently. If messages are to be sorted from an input tape to two separate output tapes, for example, one output tape may be stopped while the message on the input tape is recorded on the other output tape. Similarly, if only given messages are to be extracted from the input tapes, the output tapes will not be running except when the desired messages are encountered. Magnetic tapes run at high speeds in modern practice, however, and characters are positioned closely together on them. Accordingly, mechanical means for starting and stopping the tapes may require the provision of space on the tape to allow for inertia effects. Thus between individual messages there is preferably provided sufficient space for a tape to be started or stopped under normal operating conditions. Even if this provision is made, however, differences between drive mechanisms may result in the spacings on a second tape being greater than the spacings on the first tape. The effect of unequal spacings often is cumulative and may cause considerable wastage of space on a single tape, even in a single pass of the tape through the system. In such cases, there may be excessively large dead spaces on the tape.

The use of two reading stations in the message input system makes desirable an additional feature in regard to the maintenance of spacings between messages. This feature is that the space between the start of successive messages be at least the space between the two reading stations, since otherwise the information supplied in the computer cannot easily proceed in orderly sequence. If the messages were more closely spaced together a decision made by the computer might not control the recording of the corresponding message or message segment at the second reading station.

The information handling systems of the prior art have employed standard message spacings, and have accordingly accepted the waste of tape involved in such a system. Thus, the systems of the prior art do not include means for holding such spacings within predetermined limits. An intermediate storage means may be employed to provide desired spatial relationships between messages. An intermediate storage would, however, entail considerable equipment of itself, and, in addition, further devices for coordinating between the input and output systems.

Accordingly, an object of this invention is to provide a novel system for maintaining predetermined spacings between messages in an information handling system.

A further object of this invention is to provide a novel arrangement for maintaining message spacings within predetermined limits, when the messages are recorded in continuous fashion on an intermittently operated storage medium.

Another object of this invention is to provide a novel system for avoiding excess spacings between messages in a variable word length information handling system while at the same time providing a pretetermined minimum spacing between the messages.

A further object of this invention is to provide a novel system for detecting unused portions of a recording medium which are greater than a predetermined maximum.

Another object of this invention is to provide an improved system for signalling the consecutive occurrence of individual signals from one group of sources without the intervention of other signals from a second group of sources.

Still another object of this invention is to provide an improved system for signalling coincidence between two steady state signals having different times of origination.

Yet another object of this invention is to provide a novel control system for maintaining the spacings between message groupings on magnetic tape within predetermined limits, as the tapes are operated intermittently in a data processing system.

A further object of this invention is to provide a novel message spacing control device for an information handling system which manipulates variable length messages in sorting, collating, merging, and extracting processes.

A further object of this invention is to provide a novel device for detecting and eliminating excessive dead spaces between messages recorded in sequence, and for providing predetermined minimum spacings between the termination of one message and the commencement of the succeeding message, as well as predetermined minimum spacings between the commencement of succeeding messages.

According to one feature of the invention, the drive mechanisms for the recording medium in an information handling systems are regulated in accordance with preselected conditions when operated intermittently. One particular exemplification of the invention operates with one intermittently operated input system and two intermittently operated output systems. The commencement and termination of messages transferred to an output system are detected by recognition gates which are coupled to separate inputs of a coincidence gate. The recognition gate outputs are delayed for predetermined periods. The delays assure that the conditions for stopping have occurred. Further signals, evidencing reasons for stopping, are required before the coincidence gate provides an output signal suitable for stopping the output system. When excessive dead space is present on an input tape, this condition is detected and a signal is provided to stop the output tapes (other conditions being satisfied) until the dead space has passed. Thus, unused spaces greater than a predetermined maximum are reduced to desired limits.

In accordance with a further feature of the invention a dead space detector is provided for operation with an input system having a pair of serially disposed reading heads. Start message and end message signals are recognized and, after predetermined delays, are utilized with a system of gates to provide a signal for activating the stop controls of the output system. In accordance with yet another feature of the invention a D.-C. "and" gate is provided for detecting the coincident occurrence of a plurality of input signals which may or may not co-exist in time. The input signals are employed to activate bistable multivibrators, which in turn activate a coincidence gate so arranged as to provide a single output spike when all multivibrators are in the desired quiescent condition. The system is automatically reset by its own output or by the existence of predetermined signal configurations on its inputs.

A system for practicing this invention may be employed in many different environments typified by various systems here generally called computers or data processing systems. Examples of such computers are well-known to those skilled in the art. One example of a system which may be employed in practicing the invention is described in an article entitled "The Logistics Computer" written by R. S. Erickson and published in the October 1953 issue of the Proceedings of the IRE, pp. 1325–1332. The computer described processes large masses of numerical data with high-speed magnetic tape input and output equipment. This computer has provision for high-speed memory and programming functions, and may provide a desired sequence of arithmetic operations. While the computer described utilizes a fixed word length, those skilled in the art will realize that data processing routines of a repetitive nature, such as sorting, may be accomplished by other programming techniques. Variable word length messages may be utilized more simply in these data processing routines, however, by the further employment of the features of other systems. These systems may be those described in a copending application entitled "Message Comparator," Serial No. 394,693, filed November 27, 1953 by W. R. Ayres and J. N. Smith, and in another copending application entitled "Information Selecting Circuit," Serial No. 418,679, filed March 25, 1954 by J. N. Smith, now U.S. Patent 2,854,652, issued September 30, 1958. Both of the above referred to applications are assigned to the assignee of the present invention. In processing input information which is stored in separate messages having significant signals, the information selecting circuit may select out desired segments of messages, the message comparator may make a decision on the basis of these segments as to the order of precedence of the messages, and the computer referred to may store and transfer information and integrate the operation of the individual circuits.

The use of the term computer in this specification is intended to include not only the specific computer previously referred to, but also data processing and information handling systems in general, and particularly devices for performing sorting, collating, and processing operations. To explain this invention, however, the input and output devices employed in conjunction with the computer are herein regarded as separate. For purposes of illustration, the computer referred to herein may make decisions for extracting, merging, and sorting data. To provide an integrated operation with input and output devices, such a system may provide:

(1) Start and stop signals for operating message input systems and message output systems.

(2) A determination as to the output system to be employed, based on input information from the input system and from the predetermined sorting criteria.

(3) Means for transferring information from a desired input system to a desired output system.

(4) Predetermined operating conditions, such as the detection of errors and the classification of information according to broad logical rules.

(5) A continuous coordination between input and outputs. Thus, when one processing step has been completed the computer repeats the sequence with the next input message.

The novel features of the invention, as well as the invention itself, both as to its organization and method of operation, will best be understood from the following description, when read in connection with the accompanying drawings, in which like reference numerals refer to like parts, and in which.

Figure 1:
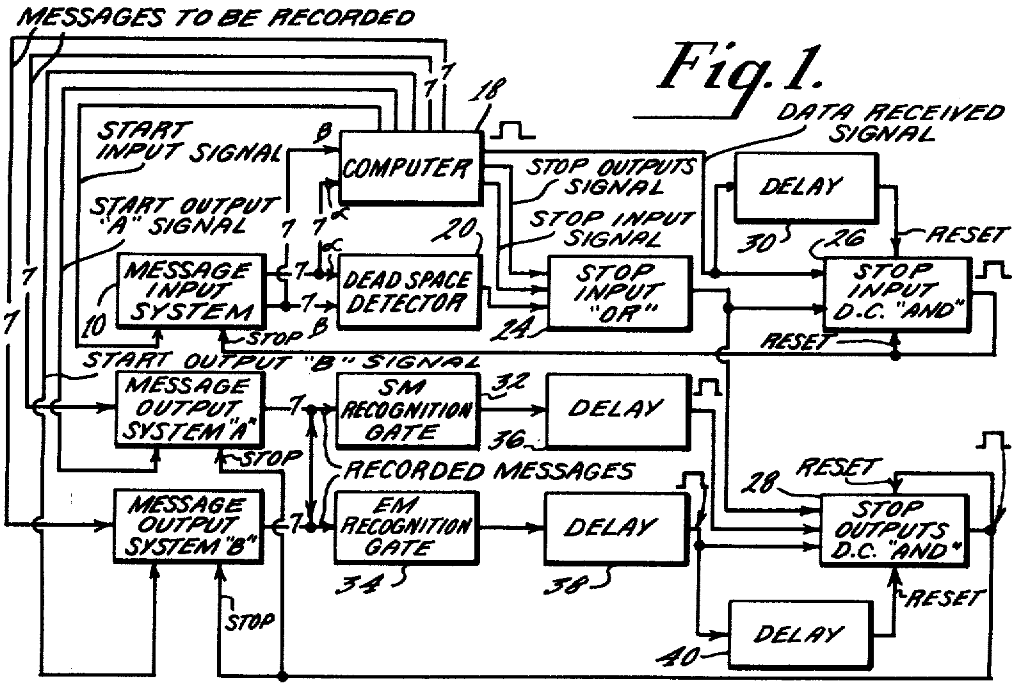
Fig. 1 is a schematic representation, in block diagram form, of an arrangement having one input and two output systems for practicing the invention.

Referring to Fig. 1, two message output systems, here identified as output systems A and B, respectively, are used in conjunction with a computer 18. As stated previously, the computer 18 provides start signals to an input system 10 and to each of the output systems through individual couplings to those systems. The message input system 10 herein illustrated employs two reading stations (not shown) which operate successively with respect to the input recording medium. The first reading station that the recording medium encounters is here termed the $\alpha$ reading station, while the second reading station that the recording medium encounters is herein called the $\beta$ station. Each of these stations in the message input system 10 is coupled by seven parallel channels to the computer 18, which in turn is coupled similarly to the inputs of the two message output systems. Messages to be recorded, therefore, are directed from the input system 10 into the computer 18, which decides which output system, A or B, is to receive the message. The computer 18 then starts the proper output system, and transfers the message to it. The recording media employed in this exemplification of the invention may be magnetic tapes, driven by drive means of which several are well known in the art.

Also coupled to the $\alpha$ and $\beta$ reading stations is a "dead space detector" 20, which is described in greater detail hereinafter in connection with Fig. 2. The output of the dead space detector 20, and also two outputs (one providing stop output signals and the other providing stop input signals) from the computer 18, are coupled to the inputs of a stop input "or" gate 24. An "or" gate is well known to those skilled in the art, and provides an output when a signal of proper polarity exists on any one or more of its inputs. The output of the stop input "or" gate 24 is coupled to one signal input of a stop input D.-C. "and" gate 26 and to one input of a stop output D.-C. "and" gate 28. These D.-C. "and" gates are more fully described hereinafter (in connection with Fig. 4). The stop input D.-C. "and" gate 26 has two signal inputs and two reset inputs, the remaining signal input being coupled to the computer 18 and responsive to signals from the computer when the computer has received sufficient information to make a decision. The same coupling from the computer 18 is also directed through a delay line 30 to a reset input of the stop input D.-C. "and" gate 26. The output of the stop input D.-C. "and" gate 26 is coupled to the stop input of the message input system 10, and also to its own remaining reset input.

Messages recorded on either of the message output systems A or B are directed, through the seven parallel channel couplings, to the inputs of a start message SM recognition gate 32 and an end message EM recognition gate 34. These recognition gates 32, 34 may be of the type shown and described in Patent 2,648,829 issued to W. R. Ayres and J. N. Smith, entitled "Code Recognition System." When and only when a code recognition gate receives a predetermined input signal configuration, the gate provides an output. The outputs of each of these gates 32, 34 are directed, through individual delay lines 36, 38 to individual signal inputs of the stop outputs D.-C. "and" gate 28. The stop outputs D.-C. "and" gate 28, therefore, has three signal inputs, one responsive to the stop input "or" circuit 24 and the other two responsive, through the respective delay lines 36, 38, to the outputs of the individual code recognition gates 32, 34. The output of the delay line 38 coupled to the EM recognition gate 34 is also coupled, through another delay line 40, to a reset input of the stop outputs D.-C. "and" gate 28. The output of the stop outputs D.-C. "and" gate 28 is coupled to the stop inputs of each of the message output systems A and B, and also to its remaining reset input.

Figure 2:
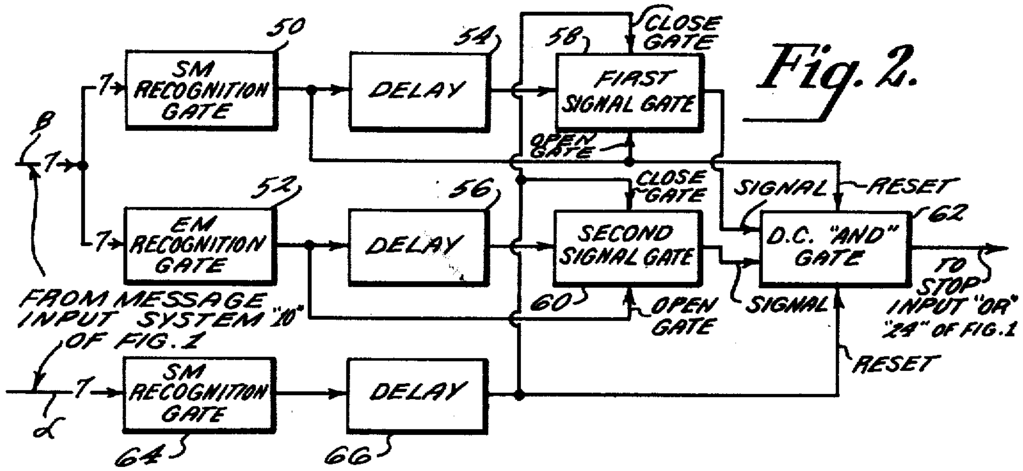
Fig. 2 is a schematic representation of a "dead space detector" such as may be used in the correspondingly identified block in Fig. 1.

The arrangement of the dead space detector 20 of Fig. 1 is shown more fully in Fig. 2. Referring to Fig. 2, the seven conductors which carry the $\beta$ input message are connected to the inputs of start message (SM) and end message (EM) recognition gates 50 and 52, respectively. These gates 50, 52 may be of the type previously referred to and more fully described in the above mentioned Patent No. 2,648,829 to Ayres and Smith. The outputs of the recognition gates 50, 52 are coupled individually through delay lines 54, 56 to the signal inputs of first and second signal gates 58, 60, respectively. The output of the SM recognition gate 50 is also connected directly to the open gate input of the first signal gate 58 and a reset input of a D.-C. "and" gate 62. The signal gates 58, 60 herein employed may be "opened" and "closed" by signals applied to open and close inputs, respectively. When open, the gates 58, 60 provide an output signal in response to an input signal. Circuits for such a signal gate are well-known. The signal gate 58 or 60 may consist, for example, of a bistable multivibrator combined with a two section Rossi or coincidence gate. One of the quiescent potential levels on one of the terminals of the bistable multivibrator in one stable state may be employed to activate one section of the Rossi gate, so that application of an input signal to the second section of the Rossi gate provides an output signal from the gate. A close signal for this arrangement is thus a signal which switches the bistable multivibrator so that one section of the Rossi gate is not activated.

The $\alpha$ input message from the input system is applied to the input of a start message SM recognition gate 64 of the type previously referred to. The output of this SM recognition gate 64 is coupled through a delay line 66 to a reset input of the D.-C. "and" gate 62 and also to the close gate inputs of the first and second signal gates 58 and 60. The outputs of the first and second signal gates 58, 60 are coupled to the signal inputs of the D.-C. "and" gate 62, and the output of the latter gate 62 is coupled to the stop input "or" gate of Fig. 1 (not shown in Fig. 2). The D.-C. "and" gate 62 may be of the type described with respect to Fig. 4.

Figure 3:
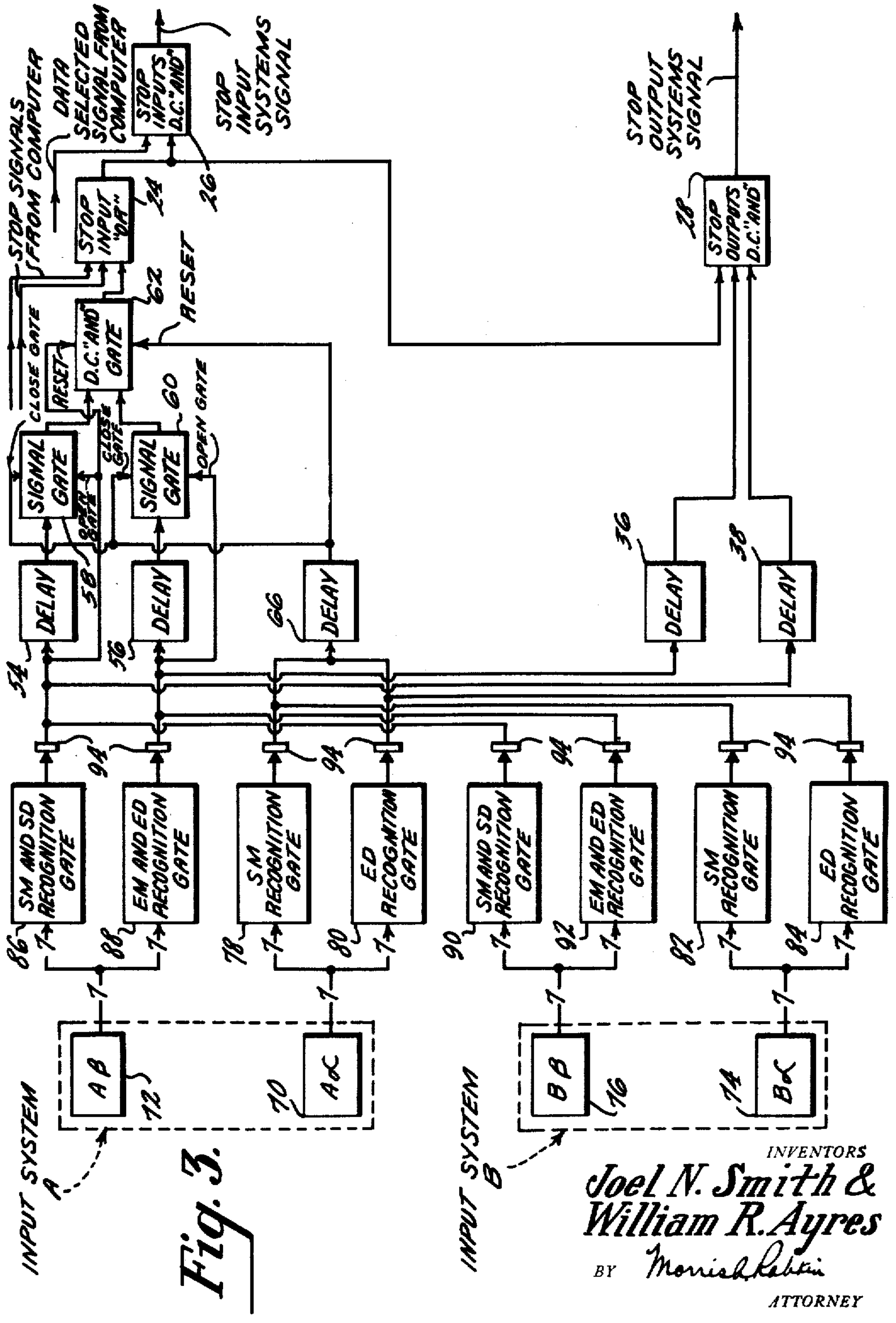
Fig. 3 is a block diagram of an arrangement having two input systems and two output systems which may be employed with the computer of Fig. 1 in practicing the invention.

By way of further illustration, the features of the invention may also be employed in conjunction with an information handling system having two input systems, and two tape reading stations in each system, as illustrated in Fig. 3. Referring to Fig. 3, the individual message input systems are identified as the A and B message input systems, respectively. Each input system has an $\alpha$ reading station 70 (or 74) and a $\beta$ reading station 72 (or 76). The recording medium, preferably magnetic tape, is sensed first at the $\alpha$ reading station 70 (or 74) and then passes through and is sensed at the $\beta$ reading station 72 (or 76). As previously, the representation of information is in a seven digit code, and separate conductors or channels are used to carry each digit in the code. For simplicity, only the two reading stations in each input system have been shown. It will be understood that the portion of the system illustrated in Fig. 3 coacts with a computer or information handling system (not shown) similar to that of Fig. 1, and that in order to simplify the drawing, the connections to the computer are indicated, but the computer itself is not shown.

The arrangement of Fig. 3 may employ a more comprehensive set of characteristic signals. Thus, in addition to start message SM, start document SD, and end message EM signals, there may be employed an end data ED signal. The ED signal signifies the completion of the information stored on a magnetic tape, thereby indicating that a pass has been completed.

The seven channels from the $\alpha$ reading stations 70, 74 of both the A and B input systems are coupled to the inputs of different and individual SM and ED recognition gates 78, 80, 82, and 84. The outputs of the $\beta$ reading stations 72, 76 of both the A and B input systems are each coupled to the input of a different SM and SD recognition gate 86 or 90, and to the input of a different EM and ED recognition gate 88 or 92. Thus, when the tape passes the $\alpha$ reading station 70 or 74 of an input system, the SM and ED signals are detected. Then, when the tape passes the $\beta$ reading station 72 or 76 for the same input system, SM, SD, EM, and ED signals are detected. A rectifying element 94 is coupled in the output path from each of these recognition gates. Note that with the exception of the output path from the ED recognition gate 80 or 84, the system is the same as the systems of Figs. 1 and 2. In short, a dead space detector unit is employed, and stop input and stop outputs D.-C. "and" gates 26 and 28 are utilized to provide stop signals. The units in Fig. 3 have accordingly been given the same reference characters as the like parts in Figs. 1 and 2.

Figure 4:
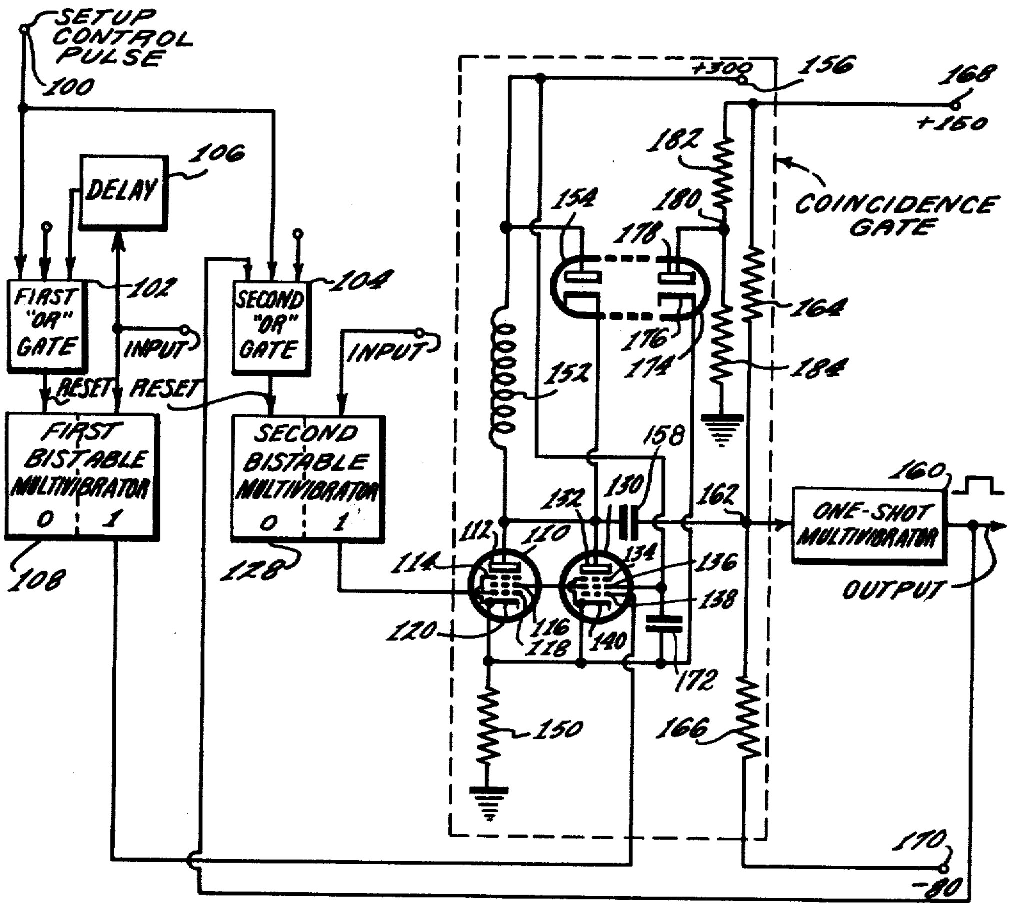
Fig. 4 is a schematic representation, partially in block diagram form, of a D.-C. "and" gate of a type suitable for use in one of the blocks, correspondingly identified, of Fig. 1.

A D.-C. "and" gate, as used herein, is a gating arrangement which performs the logical function of determining whether two or more desired input signals occur sequentially without intervening reset signals. Such a D.-C. "and" gate is shown in Fig. 4. This gate may be employed in the similarly designated blocks in Figs. 1, 2, and 3, and in addition includes an input for receiving "set up" control pulses by which the system may be placed or "set up" in a starting condition. The set up control pulse input 100 is coupled to one input of each of a pair of three input "or" gates 102, 104. These "or" gates 102, 104 may be of the type of "or" gate previously referred to in connection with Fig. 1. Two signal inputs are employed, each being responsive to a signal from a different source in the system. One signal input is coupled both through a delay line 106 to a second input of a first "or" gate 102 and to the set section of a first bistable multivibrator 108. The third input to the "or" gates 102, 104 may be employed to receive other, external, reset signals as desired. The output of the first "or" gate 102 is coupled to the reset section of the first bistable multivibrator 108. The other of the signal inputs is coupled to the set section of a second bistable multivibrator 128. A bistable multivibrator, or flip-flop, has two terminals. The voltage level on one terminal of the bistable multivibrator is, when the multivibrator is in one stable state, relatively high while the voltage level on the other output is relatively low. The conditions of stability may be reversed, however, by the application of input pulses of proper polarity to the multivibrator, with reversal of the voltage levels on these terminals. The terminals of the bistable multivibrators 108, 128 employed in Fig. 4 have been designated for illustrative purposes as "zero" (0) and "one" (1) terminals. Systems which employ this designation often utilize the high level output at a terminal, so that in these systems a multivibrator is in a binary one condition when providing a high level output at the "one" terminal. Here, however, as will be apparent later, the multivibrator output which is employed as a signal in the succeeding coincidence gate is the low level output. Thus a multivibrator 108 or 128 is said to be in a binary one condition when providing a low level potential on its "one" terminal. It follows that when a bistable multivibrator provides a low level potential on its "zero" terminal, the potential on the "one" terminal is not useful in activating the coincidence gate. The input to the section of the multivibrator which includes the "zero" terminal has therefore been designated as the reset input, while the input to the section which includes the "one" terminal has been designated as the signal input, or merely the input.

The second "or" gate 104 has its remaining inputs coupled to the final output of this D.-C. "and" gate system and to an external reset input. The output of the second "or" gate 104 is coupled to the reset input of the second bistable multivibrator 128.

The "one" outputs of the first and second multivibrators 108, 128 are individually coupled respectively to the control grids 118, 138 of first and second control pentodes 110, 130 within a coincidence detecting circuit or coincidence gate shown enclosed by a dotted line. The anodes 112, 132 of the first and second pentodes 110, 130 are connected together. The suppressor grid 114, 134 of each pentode 110, 130 is connected to its respective cathode 120, 140. The screen grids 116, 136 of the pentodes 110, 130 are connected together. The cathodes 120, 140 of the pentodes 110, 130 are connected together and, through a common cathode resistor 150, to a common conductor here designated by the conventional ground symbol. The commonly connected anodes 112, 132 of the two control pentodes 110, 130 are coupled through a parallel inductor 152 and diode 154 to a +300 volt source 156 and also through a coupling capacitor 158 to the input of a one-shot multivibrator 160. A one-shot, or monostable multivibrator, is well known to those skilled in the art, and provides an output pulse of substantially rectangular wave-shape in response to an input signal. The input to the one-shot multivibrator 160 is applied from the mid-point 162 of a pair of resistors 164, 166 which constitute a voltage divider between a +150 volt source 168 and a −80 volt source 170. The commonly connected cathodes 120, 140 of the two control pentodes 110, 130 are coupled through a capacitor 172 to the commonly connected screen grids 116, 136, and thence to the +300 voltage source 156. The commonly connected cathodes 120, 140 are also connected to the cathode 176 of a clamping diode 174, the anode 178 of which is connected to the mid-point 180 of a voltage divider consisting of a pair of resistors 182, 184 coupled between the +150 voltage source 168 and ground. The output of the one-shot multivibrator 160 represents the output of this D.-C. "and" gate system.

In operation of the embodiment of Fig. 1, stop signals for the message input system 10 and the output systems A and B are controlled in accordance with predetermined conditions. Assume, for illustrative purposes, that the computer 18 is to select a certain class of messages from the message input system 10 and is to put the selected class in message output system A and the remainder in message output system B. The message input system 10 is provided with a start signal from the computer 18, and transmits a message first as the message passes the $\alpha$ reading station and then as the message passes the $\beta$ reading station. The computer 18 makes a decision as to which output system A or B should receive this message, based on the information received from the $\alpha$ reading station of the message input system 10. The computer 18 then starts the desired output system, A or B, and transfers the message as it is provided by the $\beta$ reading station.

As a message is read into a message output system, A or B, the same message is directed to the coupled SM and EM recognition gates 32, 34. The SM recognition gate 32 provides an output which is delayed by the coupled delay unit 36 sufficiently to permit passage of the magnetic tape at normal speed from the $\alpha$ to the $\beta$ reading station. The output of the delay unit 36 then activates one input of the stop outputs D.-C. "and" gate 28. The EM recognition gate 34 provides an output which is delayed in delay unit 38 sufficiently to provide space to overcome mechanical inertia effects in stopping and starting and then is employed to activate another output of the stop outputs D.-C. "and" gate 28. An output will not be provided by the stop outputs D.-C. "and" gate 28, therefore, until these conditions (a delay after the start of a message sufficient to account for the spacing between $\alpha$ and $\beta$ reading stations, and a delay sufficient to account for mechanical inertia effects) have first been satisfied. A signal to stop an output system A or B accordingly may have been provided by the computer 18 to the remaining input of the stop outputs D.-C. "and" gate 28, but such a stop signal is inhibited and is not effective until the other two inputs have been activated. The same is true of a stop input signal from the computer 18.

The dead space detector 20 operates in this system to stop only the output tapes for the period during which excessive blank space is present on the input tape. When such a "dead" space is detected, the impulse provided from the dead space detector 20 activates one input of the stop input "or" gate 24. The stop input "or" gate 24 accordingly activates one output of the stop outputs D.-C. "and" gate 28. When the conditions for stopping, as referred to above, are satisfied, an output is then provided from the stop outputs D.-C. "and" gate 28 to stop the message output system A or B then being employed. Outputs from the dead space detector 20, as well as stop input and stop output signals from the computer 18, are also directed through the stop input "or" gate 24 to one input of the stop input D.-C. "and" gate 26. Stop signals for the message input system 10 are inhibited, however, until the stop input D.-C. "and" gate 26 receives a separate signal from the computer 18 indicating that satisfactory conditions have been met for stopping the input tape. These conditions are that the computer 18 has received from the $\alpha$ reading station all the information from the next succeeding message required as a basis for making a decision. When this information is received a signal is provided by the computer 18 and the stop input D.-C. "and" gate 26 provides an output which stops the message input system. A cycle of operation may then be commenced anew, in accordance with the sorting process being effectuated.

The reset arrangements provided at the D.-C. "and" gates 26, 28 automatically condition these "and" gates for each succeeding operation. A data received signal from the computer 18, for example, first is used to provide a signal input to the stop input D.-C. "and" gate 26, and then, after a delay in delay unit 30, automatically resets that section. If the other input of the stop input D.-C. "and" gate 26 had previously been activated, the gate 26 would then, by its own output, reset that section. Since the data received signal is derived from the message following the dead space, it follows a dead space signal, and orderly reset is thereby assured.

The stop outputs D.-C. "and" gate 28 is actuated only after the delayed end message signal has been provided. In the ordinary circumstance a dead space signal or other stop signal has been previously provided, if there is to be a stoppage, so that following the end message signal the stop outputs D.-C. "and" gate 28 should be prepared for a new cycle of operation. Thus, after a delay in the coupled delay unit 40, the end message signal resets one side of the stop outputs D.-C. "and" gate 28. As in the stop input D.-C. "and" gate 26, an output automatically resets the other section if that other section is set.

The dead space detector (refer to Fig. 2) provides an indication that an excessive blank space is present on the tape in the message input system. The input message from the α reading station is directed to the SM recognition gate 64, which detects the commencement of the message and provides an output. This output is directed through the delay line 66, which retards it sufficiently to allow for mechanical inertia effects, and the output is then passed to the close gate input of the first signal gate 58, the close gate input of the second signal gate 60 and to one reset input of the D.-C. "and" gate 62. The D.-C. "and" gate 62 provides an output on receiving successive signals on its two inputs. When an excessive dead space is present, these signals are supplied from the β reading station. The start message character is recognized as it passes the β reading station by the SM recognition gate 50. The SM recognition gate 50 provides an open gate signal to the first signal gate 58 and a reset signal to the D.-C. "and" gate 62. The D.-C. "and" gate 62 still awaits two signal inputs at this point in time. The output of the SM recognition gate 50 is delayed sufficiently to permit passage of a tape at normal speed from the α to the β reading station, and then the signal is employed as an input to the first signal gate 58. Since the first signal gate 58 has already been opened by an undelayed impulse from the SM recognition gate 50 output, the first signal gate 58 provides an output which becomes the signal input to one input of the D.-C. "and" gate 62.

When the termination of a message passes under the β reading station, the coupled EM recognition gate 52 recognizes the message terminating signal and provides an output. The EM recognition gate 52 output is directed without delay to the open gate input of the second signal gate 60, and after a delay in the delay unit 56 to compensate for inertia effects is applied to the signal input of the second signal gate 60. Since the second signal gate 60 is opened by the undelayed signal from the EM recognition gate output 52, the second signal gate 60 provides an output. This output becomes a signal on the second signal input of the D.-C. "and" gate 62. Thus, both signal inputs of the D.-C. "and" gate 62 are primed or activated by successive signals, without the intervention of other signals. The D.-C. "and" gate 62, therefore, provides an output, which is utilized in the manner described above with reference to Fig. 1. In summary, an output is provided from the dead space detector once a predetermined set of conditions have been satisfied and a delay greater than a predetermined amount follows an end message signal.

Referring to Fig. 1, as well as Fig. 2, it may be noted that the stop input D.-C. "and" gate 26 requires an output from the computer 18 as well as from the dead space detector 20 before the stop input D.-C. "and" gate 26 provides on output. Normally this computer 18 output, which indicates that the computer has received from the next message following the dead space the information necessary for making a decision, follows the dead space detector output.

The arrangements of Figs 1 and 2 are illustrative only, and are not intended to limit the scope of the invention. The invention may also be practiced, for example, in a sorting and collating system of broader application. As one example, there may be two message input systems, and the computer may make a comparison between messages on each of the two input systems, or even between messages from the two input systems and one of the output systems. Such a system may utilize successive sorting programs, in which the input system in one step becomes an output system in the following step. If such a program is followed, the invention may be practiced merely by the application and inclusion of proper switching techniques. One exemplification of the invention as practiced with a broader sorting system is shown in Fig. 3.

The arrangement of Fig. 3 utilizes only one of two input systems, A or B, at a time in an information sorting process. As previously, the decision as to which input system is to be used, and the decision as to the further disposition of the message therein, is made by the computer (not shown). The operation of the system is the same irrespective of which input system is employed. In the normal course of operation, taking system A as an example, messages composed of trains of characters pass sequentially through the α reading station and then the β reading station. As previously, SM signals at the α reading station are applied to one reset input of the D.-C. "and" gate 62 in the dead space detector, and commence the sequence of operations. The desired minimum space between messages is then provided, and dead spaces greater than a predetermined maximum length are reduced to the predetermined length, as described in connection with Figs. 1 and 2. An additional feature is employed in conjunction with the output of the ED recognition gate 80 or 84, of Fig. 3. An ED recognition gate 80 or 84 output resets the dead space detector, so that a pass may be completed despite the existence of further dead space on the tape. Completion of the pass after the end data signal is desired because no further information is recorded on the tape, and no further sorting operation is employed.

The use of a second dead space detector is avoided by the connection of both input systems, A and B, to the same dead space detector, with the inclusion of rectifying elements 94 to block transient pulses. Two or more dead space detectors may, however, be used if other considerations require. Separate SM and SD recognition gates, and separate EM and ED recognition gates are not employed to provide input signals to the stop outputs D.-C. "and" gate 28, as in Fig. 1. These signals are derived in the exemplification of Fig. 3 from the input systems and the coupled recognition gates, since the signals from the input systems A or B are transferred, with a delay of only a few micro-seconds, to the output systems.

Refer to Fig. 4, which shows the arrangement of a two input D.-C. "and" gate. Upon the establishment of starting conditions, as by the application of a set-up control pulse, the first and second bistable multivibrators 108, 128 provide low level potentials on their "zero" outputs because of the signals applied to their reset inputs through the first and second "or" gates 102, 104, respectively. When input signals are applied to both the first and second multivibrators 108, 128 to switch those multivibrators 108, 128 so that they provide low level outputs simultaneously on their "one" terminals, the system provides a single output signal. The single output signal is provided by the associated coincidence gate. Note that external reset inputs may be applied as desired to the first or second "or" gates 102, 104. Note also that the number of bistable multivibrators 108, 128 and control pentodes 110, 130 may be increased, since each is essentially in parallel to and independent of the others. For example, a third control pentode and a third bistable multivibrator may be exployed in conjunction with the two control pentodes and two bistable multivibrators shown in Fig. 4.

The third control pentode would have its anode, screen grid, and cathode connected to the like elements of the other pentodes. The control grid of the third control pentode would be coupled to the "one" terminal of the third bistable multivibrator. The three-pentode coincidence gate would then provide an output when and only when all three bistable multivibrators were in the "one" condition.

The coincidence gate of Fig. 4 is essentially a constant current device which provides an output only when both the control pentodes 110, 130 are cut off. When the bistable multivibrators 108, 128 are both in the "zero" condition, they provide low level outputs on their "zero" terminals and high level outputs on their "one" terminals. The control grids 118, 138 of the control pentodes 110, 130 are thus at high potentials, which results in conduction in the pentodes 110, 130. In this stable state of conduction, the cathodes 120, 140 of the control pentodes 110, 130 are at a positive potential because of (1) the potential of the control grids 120, 140, (2) the flow of current from the +150 volt source 168 through the clamping diode 174, and (3) the resistor 150 coupling the cathodes 120, 140 to ground. When only one bistable multivibrator 108 or 128 is switched so as to provide a low level potential output at its "one" terminal only the corresponding control pentode 110, 130 is cut off. The commonly connected cathodes 120, 140 of both pentodes 110, 130 accordingly experience little change in potential, so that the current through both of the control pentodes 110, 130 and the coupled anode inductor 152 changes only slightly in value. Thus no appreciable output is provided to trigger the one-shot multivibrator 160.

When both bistable multivibrators 108, 128 are switched to provide low level outputs at the "one" terminals, however, both control pentodes 110, 130 are cut off. As a result, the current flowing in the pentodes 110, 130 drops rapidly, causing an induced sine wave (due to the inductive "kick" from inductor 152) of voltage on the anodes 112, 132 of the control pentodes 110, 130. The diode 154 in parallel with the inductor 152 damps out all but the first positive half cycle of the sine wave. The first positive half cycle, however, provides a sharp voltage spike which triggers the following one-shot multivibrator 160. The one-shot multivibrator 160 in turn provides an output of fixed duration and amplitude having a substantially rectangular waveform suitable for use in subsequent electronic devices.

Thus there has been described a novel and efficient system for controlling intra-message spacings in an information handling system which manipulates sequences of messages. The system operates to conserve the recording medium, and yet compensates for inconsistencies in mechanical operations. The system may further be employed advantageously in a number of data processing environments.

What is claimed is:

1. In an information handling system employing intermittently operable input and output devices to transfer information in variable length messages from an input recording tape to an output recording tape, said messages having characteristic commencing and terminating signals, an arrangement for maintaining the spacings between messages within predetermined limits comprising means including time delay means responsive to said characteristic commencing and terminating signals in said messages for providing stop signals for said output devices when the time interval between a terminating signal and the next succeeding commencement signal exceeds a predetermined amount, means for detecting commencement signals in said messages, means for detecting terminating signals in said messages, said time delay means being coupled individually to each of said detecting means, and means responsive to said individual time delay means, said information handling system, and said means for providing stop signals, for inhibiting stoppage of said output devices for predetermined periods of time following the commencement and termination of messages, said means for providing stop signals including said means responsive to said messages to detect said characteristic signals, said delaying means and responsive to said detecting means, signal gating means responsive to said delaying means and having two conductors coupled to said output devices for providing first and second outputs respectively when (1) the commencement and (2) the termination of a first message precede the commencement of a second message by predetermined amounts of time, and output means coupled to said signal gating means to provide a signal when said first and second outputs occur in sequence.

2. In an information handling system employing intermittently operable input and output devices to transfer information in variable length messages from an input recording tape to an output recording tape, said messages having characteristic commencing and terminating signals, an arrangement for maintaining the spacings between messages within predetermined limits comprising means including time delay means responsive to said characteristic commencing and terminating signals in said messages for providing stop signals for said output devices when the time interval between a terminating signal and the next succeeding commencement signal exceeds a predetermined amount, means for detecting commencement signals in said messages, means for detecting terminating signals in said messages, time delay means coupled individually to each of said detecting means, and means responsive to said individual time delay means, said information handing system, and said means for providing stop signals, for inhibiting stoppage of said output devices for predetermined periods of time following the commencement and termination of messages, said information handling system including at least two input devices and two output devices, said means for providing stop signals being responsive to both said input devices, and said means for inhibiting stoppage of said output devices including a D.-C. "and" gate.

3. In an information handling system employing intermittently operable input and output devices to transfer information in variable length messages from an input recording tape to an output recording tape, said messages having characteristic commencing and terminating signals, an arrangement for maintaining the spacings between messages within predetermined limits comprising means including time delay means responsive to said characteristic commencing and terminating signals in said messages for providing stop signals for said output devices when the time interval between a terminating signal and the next succeeding commencement signal exceeds a predetermined amount, means for detecting commencement signals in said messages, means for detecting terminating signals in said messages, time delay means coupled individually to each of said detecting means, and means responsive to said individual time delay means, said information handling system, and said means for providing stop signals, for inhibiting stoppage of said output devices for predetermined periods of time following the commencement and termination of messages, said information handling system including one input device and two output devices, said means for detecting commencement signals and said means for detecting terminating signals each including a code recognition gate, and said means for inhibiting stoppage of said output devices including a D.-C. "and" gate.

4. In an information handling system employing an intermittently operable input device and two intermittently operable output devices to transfer information in variable length messages from an input recording tape to one of two output recording tapes, said messages having characteristic starting and ending signals and said input device having $\alpha$ and $\beta$ reading stations, an arrangement for maintaining the spacings on said output recording tapes within predetermined limits comprising means including time delay means responsive to said characteristic starting and ending signals in the messages at said α and β reading stations for providing stop signals for said output devices when the duration of time between an ending signal and the next succeeding starting signal exceeds a predetermined amount, a code recognition gate responsive to the occurrence of starting signals in said messages, a code recognition gate responsive to the occurrence of ending signals in said messages, individual time delay means responsive to each of said code recognition gates, and a D.-C. "and" gate responsive to said individual time delay means and said means for providing stop signals and coupled to said output devices for inhibiting transfer of stop signals to said output devices until predetermined conditions have occurred.

5. In an information handling system employing at least two intermittently operable input devices and at least two intermittently operable output devices to transfer information in variable length messages from one of at least two input recording tapes to one of at least two output recording tapes, said messages having characteristic starting and ending signals and said input devices each having α and β reading stations, an arrangement for maintaining the spacings on said output recording tapes within predetermined limits comprising a plurality of sets of code recognition means, each set having a plurality of output conductors and being coupled to the α and β reading stations of a different one of said input devices, to signal the existence of said characteristic signals on different ones of said conductors, means including time delay means and signal gating means coupled to the output conductors of each set of code recognition means for providing stop signals for said output devices when the duration of time between an ending signal and the next succeeding commencing signal exceeds a predetermined amount, time delay means coupled to the output conductors of the code recognition means associated with said β reading stations, and a D.-C. "and" gate coupled to said time delay means, said output devices and said means for providing stop signals for inhibiting transfer of stop signals to said output devices until predetermined conditions have been satisfied.

6. In an information handling system which utilizes an intermittently operated input device having α and β reading stations to transfer messages recorded on magnetic tape to an output device, and which represents the commencement and termination of messages by characteristic signals, an arrangement for detecting blank spaces greater than a predetermined maximum on said magnetic tape, said arrangement comprising means coupled to said β reading station to detect said commencement characteristic signals, means coupled to said β reading station to detect said termination characteristic signals, means coupled to said α reading station to detect said commencement characteristic signals, individual delay means coupled to each of said detecting means, a pair of signal gate means coupled to said delay means to provide first and second outputs when (1) the commencement characteristic signal at the β reading station and (2) the termination characteristic signal at the β reading station precede the commencement characteristic signal at the α reading station by predetermined amounts of time, and a D.-C. "and" gate means responsive to said first and second outputs to provide a signal that a blank space greater than a predetermined amount has been detected.

References Cited in the file of this patent

UNITED STATES PATENTS

| | | |
|---|---|---|
| 2,477,309 | Maxwell | July 26, 1949 |
| 2,583,983 | Arndt | Jan. 29, 1952 |
| 2,632,104 | Lakatos | Mar. 17, 1953 |
| 2,632,845 | Goldberg | Mar. 24, 1953 |
| 2,659,815 | Curtis | Nov. 17, 1953 |
| 2,668,283 | Mullin | Feb. 2, 1954 |
| 2,700,067 | Lockemann et al. | Jan. 18, 1955 |
| 2,818,322 | Blakely | Dec. 31, 1957 |

OTHER REFERENCES

Review of Input-Output Equipment Used in Computing Systems, Joint AIEE-IRE-ACM Computer Conference, article entitled "Engineering Organization of Input and Output for the IBM 701 Electronic Data-Processing Machine," pp. 81–85, March 1953.